US008569988B2

(12) United States Patent
Tsagarakis et al.

(10) Patent No.: US 8,569,988 B2
(45) Date of Patent: Oct. 29, 2013

(54) ELASTIC ROTARY ACTUATOR, PARTICULARLY FOR ROBOTIC APPLICATIONS, AND METHOD FOR CONTROLLING THE SAME

(75) Inventors: Nikos G. Tsagarakis, Genoa (IT); Darwin G. Caldwell, Serra Ricco' (IT); Matteo Laffranchi, Genoa (IT); Bram Vanderborght, Boechout (BE)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 468 days.

(21) Appl. No.: 12/753,772

(22) Filed: Apr. 2, 2010

(65) Prior Publication Data
US 2010/0253273 A1 Oct. 7, 2010

(30) Foreign Application Priority Data
Apr. 3, 2009 (IT) .............................. TO2009A0257

(51) Int. Cl.
B25J 9/18 (2006.01)
(52) U.S. Cl.
USPC ...................................... 318/568.11; 318/461
(58) Field of Classification Search
USPC ............. 318/568.11, 568.16, 568.18, 568.22, 318/461
See application file for complete search history.

(56) References Cited

U.S. PATENT DOCUMENTS

| 2,632,318 | A | | 3/1953 | Ernst Meyer | |
| 5,101,472 | A | * | 3/1992 | Repperger | 700/261 |
| 5,551,308 | A | * | 9/1996 | Arai et al. | 73/862.541 |
| 5,726,520 | A | * | 3/1998 | Grahn | 310/328 |
| 7,553,266 | B2 | * | 6/2009 | Abdoli-Eramaki | 482/124 |
| 2004/0102723 | A1 | * | 5/2004 | Horst | 601/5 |
| 2007/0056592 | A1 | * | 3/2007 | Angold et al. | 128/845 |
| 2008/0188907 | A1 | * | 8/2008 | Aguirre-Ollinger et al. | 607/48 |
| 2009/0312870 | A1 | * | 12/2009 | Okuda et al. | 700/258 |

FOREIGN PATENT DOCUMENTS

GB  494106  10/1938

OTHER PUBLICATIONS

Italian Search Report for TO2009A000257 filed on Apr. 3, 2009 in the name of Fondazione Istituto Italiano Di Tecnologia.
Italian Written Opinion for TO2009A000257 filed on Apr. 3, 2009 in the name of Fondazione Istituto Italiano Di Tecnologia.
Wyeth, G. Demonstrating the Safety and Performance of a Velocity Sourced Series Elastic Actuator. 2008 IEEE International Conference on Robotics and Automation, Pasadena, CA, USA, pp. 3642-3647, May 19-23, 2008.

(Continued)

Primary Examiner — Rina Duda
(74) Attorney, Agent, or Firm — Steinfl & Bruno LLP

(57) ABSTRACT

An actuator and a method for controlling the actuator are described. The actuator comprises: an output member rotatable around an axis of rotation; an input member rotatable around the axis and connected for rotation with the output member via a plurality of cylindrical helical springs; a motor assembly arranged to drive the input member to rotate around the axis of rotation; first and second sensors for detecting the angular position of the input member and the relative angular position between the input member and the output member; and an electronic control unit arranged to determine a desired angular velocity of the input member on the basis of a desired value for the impedance of the actuator and to control the motor assembly on the basis of the error between the desired angular velocity of the input member and the angular velocity of the input member.

16 Claims, 2 Drawing Sheets

(56) References Cited

OTHER PUBLICATIONS

Kong, K., et al. Control of Rotary Series Elastic Actuator for Ideal Force-Mode Actuation in Human-Robot Interaction Applications. IEEE/ASME Transactions on Mechatronics, vol. 14, No. 1, pp. 105-118, Feb. 2009.
European Search Report for EP10158648.5 mailed on Jul. 26, 2010 in the name of Fondazione Istituto Italiano Di Tecnologia.
European Search Opinion for EP10158648.5 mailed on Jul. 26, 2010 in the name of Fondazione Istituto Italiano Di Tecnologia.
Tsagarakis, N., et al., A Compact Soft Actuator Unit for Small Scale Human Friendly Robot, IEEE International Conference on Robotics and Automation, Kobe International Conference Center, Kobe Japan May 12-17, 2009, 4356-4352.

* cited by examiner

ELASTIC ROTARY ACTUATOR, PARTICULARLY FOR ROBOTIC APPLICATIONS, AND METHOD FOR CONTROLLING THE SAME

CROSS REFERENCE TO RELATED APPLICATIONS

The present application claims priority to Italian Patent Application TO2009A000257 filed on Apr. 3, 2009 which is incorporated herein by reference in its entirety.

FIELD

The present disclosure relates to actuators and related methods. In particular, it relates to an elastic rotary actuator, particularly for robotic applications, and a method for controlling the same.

SUMMARY

The present disclosure relates to an elastic rotary actuator, particularly for robotic applications, comprising: an output member rotatable around an axis of rotation; a rotary motor unit operatively connected to the output member to drive it to rotate around said axis of rotation; an input member rotatably mounted around said axis of rotation and rigidly connected for rotation with an output shaft of the motor unit; and elastic means interposed between the input member and the output member to allow a relative rotation between these two components around said axis of rotation due to their elastic deformation; and control means arranged to control the motor unit.

According to a further aspect, the present disclosure also relates to a method for controlling an elastic rotary actuator of the above-identified type.

In accordance with some embodiments, the present disclosure provides an elastic rotary actuator of the above-identified type, which is of compact size, which has a high level of modularity so that it can be easily used even in complex robotic systems, and which offers the possibility of actively adjusting the stiffness thereof over a wide range of desired stiffness values.

Further embodiments of the elastic rotary actuator and of the corresponding control method according to the present disclosure are specified in the specification, claims and drawings of the present application.

Briefly, the disclosure relies on the idea of providing an elastic rotary actuator of the above-identified type, wherein said control means comprise sensor means adapted to provide a signal indicative of the angular velocity of the input member and an electronic control unit arranged to determine a desired angular velocity of the input member on the basis of a desired impedance value of the actuator and to control the motor unit on the basis of the error between the desired angular velocity of the input member and the actual angular velocity of the input member, as determined from the signal provided by said sensor means.

According to an embodiment of the present disclosure, said elastic members comprise a plurality of springs made as cylindrical helical springs and disposed with their axes in a same plane orthogonal to the axis of rotation of the input and output members, the axis of each spring being oriented so that the spring applies on the output member a force directed tangentially, i.e. perpendicularly to the radial direction. In this case, the output member can comprise a central hub portion and a plurality of spoke portions radially extending from the hub portion, the input member comprises an annular portion radially enclosing the output member, and the springs can be arranged in pairs on opposite sides of the corresponding spoke portions of the output member, each spring insisting against the respective spoke portion with one end thereof and against a wedge surface of the input member with the opposite end, whereby in case of relative rotation between the two members in one direction a first spring of each pair of springs is more compressed than the second spring, whereas in case of relative rotation in the opposite direction the second spring is more compressed than the first spring, the driving torque on the output member being proportional to the difference between the compression forces acting on the first spring and on the second spring of each of said pairs of springs.

In some embodiments, the output member can comprise three spoke portions arranged at 120°, and the input member comprises three abutment elements protruding radially inwards from the annular portion and forming each two wedge surfaces.

The motor unit can comprise a rotary electric motor coaxial with the input and output members and a reduction gear interposed between the electric motor and the input member.

In some embodiments, a first position sensor is arranged to provide a signal indicative of the angular position of the motor is associated to the electric motor. The actuator can further comprise a second position sensor adapted to provide a signal indicative of the relative rotation between the input and output members, and therefore of the deformation of the springs interposed between these members. As the torsional stiffness of the actuator depends on the deformation of the springs, the signal provided by the second position sensor can be used to evaluate the torque applied by the actuator.

As can be easily appreciated, due to the radially and axially overlapping arrangement of the input and output members, an actuator is achieved which is of very compact size, as well as of reduced weight. Moreover, due to the possibility of measuring, by means of the second position sensor, the relative rotation between the input and output members, and therefore the deformation of the springs interposed therebetween, it is possible to actively control the stiffness of the actuator.

BRIEF DESCRIPTION OF THE DRAWINGS

Further features of the present disclosure will be evident from the following detailed description, given purely by way of non-limiting example with reference to the attached drawings, in which.

DETAILED DESCRIPTION OF EXAMPLE EMBODIMENTS

Figure 1:
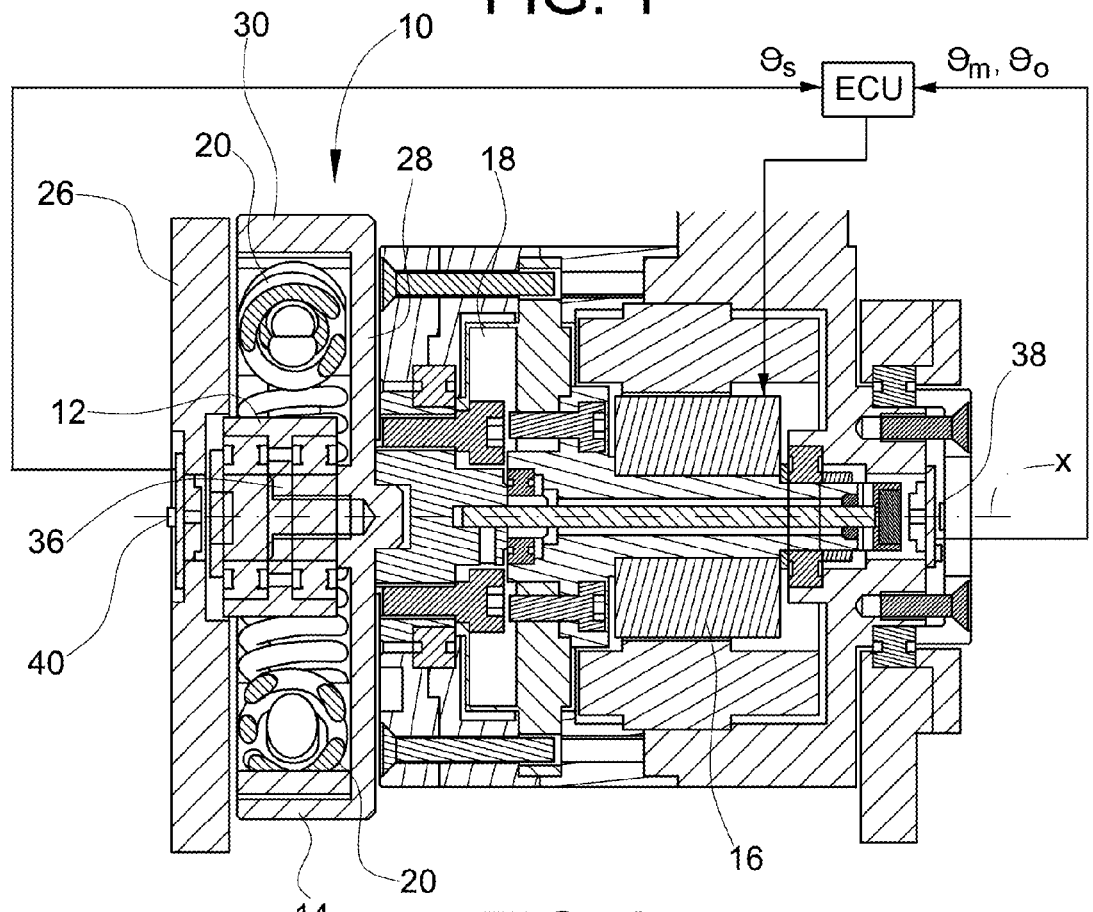
FIG. 1 is an axial section of an elastic rotary actuator according to an embodiment of the present disclosure.
Figure 2:
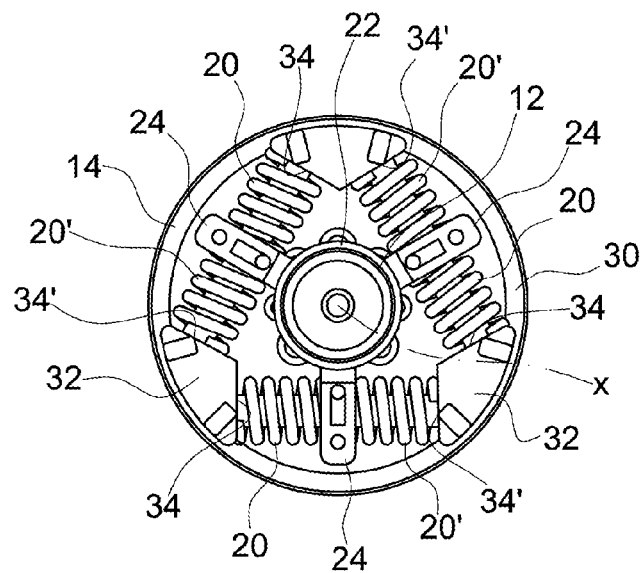
FIG. 2 is a front view of the assembly consisting of the input member, of the output member and of the springs of the actuator of FIG. 1.

With reference first to FIGS. 1 and 2, an elastic rotary actuator according to an embodiment of the present disclosure is generally indicated 10 and basically comprises:

an output member 12 rotatable around a given axis of rotation X;

an input member 14 also rotatable around the axis X and elastically connected for rotation with the output member 12;

an electric motor 16 and reduction gear 18 assembly which is rigidly connected to input member 14 to drive it to rotate around the axis X; and a plurality of springs 20 and 20' interposed between the output member 12 and the input member 14 so as to allow a relative rotation of the two members 12 and 14 around the axis X as a result of the elastic deformation of said springs.

No details will be given here about the structure of the motor and reduction gear assembly, as it is of per-se-known type and anyway not essential to the purpose of the disclosure. The motor and the reduction gear may have in fact a different structure from the one shown in FIG. 1, and the reduction gear could even be omitted.

According to the embodiment illustrated in FIGS. 1 and 2, the output member 12 comprises a central hub portion 22 and a plurality of spoke portions 24 which radially extend from the hub portion 22 and are angularly equally spaced. More specifically, in the illustrated example the output member 12 comprises three spoke portions 24 arranged at 120°. A mounting plate 26 is fixed to the output member 12 for connection to an external load intended to be driven to rotate by the actuator 10.

The input member 14 has a tumbler-like configuration, with a bottom portion 28 of circular shape laying in a plane perpendicular to the axis X and with a cylindrical sleeve portion 30 extending axially from the circumferential edge of the bottom portion 28. The radial and axial sizes of the input member 14 are selected so that the output member 12 is entirely contained within the input member 14, as clearly shown in particular in FIG. 1. The input member 14 further comprises a plurality of abutment elements 32, the number of which is equal to that of the spoke portions 24 of the output member 12, i.e. three in the embodiment shown herein. Each abutment element 32 forms a pair of wedge surfaces 34 and 34', which form an angle both to each other and to the radial direction, and which are parallel to a respective spoke portion 24 of the output member 12 in the mounted condition illustrated in FIG. 2. The input member 14 further comprises a middle hub portion 36 which is coaxial with the middle hub portion 22 of the output member 12 and serves to support this latter for rotation, wherein the two hub portions 22 and 36 can rotate relative to each other around the axis X.

In the proposed embodiment, the springs 20 and 20' are made as cylindrical helical springs and are arranged with their axes in a same plane perpendicular to the axis of rotation X (in other words, in a plane parallel to the plane of FIG. 2). More specifically, the axes of the springs 20 and 20' are oriented in such a way that each spring applies onto the output member 12 a force directed tangentially, i.e. perpendicularly to the radial direction. A pair of springs 20 and 20' is provided for each spoke portion 24 of the output member 12 (hence, three pairs of springs in the present case), the springs of each pair insisting at one end against a respective face of the associated spoke portion 24 of the output member 12, and at the opposite end against the wedge surface 34 and 34', respectively, of a respective abutment element 32 facing said respective face. The springs 20 and 20' can be mounted with a given preload, corresponding for instance to half of the maximum allowed deformation. The springs 20 and 20' can be compression springs and are therefore mounted between their respective facing stop surfaces of the output and input members 12 and 14 under a pre-compression load, corresponding for instance to half the maximum allowed compression.

Due to the spring arrangement described above, in case of relative rotation of the output and input members 12 and 14 in one direction, a first spring of each pair of springs is more compressed than the second spring, whereas in case of relative rotation in the opposite direction the second spring is more compressed than the first spring, the driving torque on the output member being proportional to the difference between the compression forces acting on the first and second springs of each of said pairs of springs. With reference in particular to FIG. 2, if the input member 14 is driven to rotate counterclockwise by the motor 16 and reduction gear 18 assembly, the wedge surfaces 34 of the abutment elements 32 of the input member 14 apply compression forces onto the springs 20 of each pair of springs 20 and 20' and, via the springs 20, tangential forces onto the spoke portions 24 of the output member 12, which tangential forces tend to cause the output member 12 to rotate counterclockwise as well. Likewise, if the input member 14 is driven to rotate clockwise, the wedge surfaces 34' apply compression forces onto the springs 20' and, via these latter, tangential forces onto spoke portions 24 of the output member 12, which tangential forces tend to cause this latter to rotate clockwise.

The electric motor 16 is provided with an angular position sensor 38 arranged to provide a signal indicative of the angular position of the motor 16, and hence of the input member 14 connected thereto motor via the reduction gear 18. The actuator 10 can further comprise a sensor 40 able to provide a signal indicative of the relative rotation between the output and input members 12 and 14, and hence of the deformation of the springs 20 and 20' interposed between these members. Since the torsional stiffness of the actuator depends on the deformation of the springs, the signal provided by the sensor 40 can be used to evaluate the torque applied by the actuator 10.

The elastic rotary actuator 10 further comprises an electronic control unit ECU, schematically shown in FIG. 1, arranged to drive the electric motor 16, and hence the output member 12, to rotate. In this connection, a method for controlling an elastic rotary actuator according to the disclosure will now be described with reference to FIGS. 3 and 4.

Figure 3:
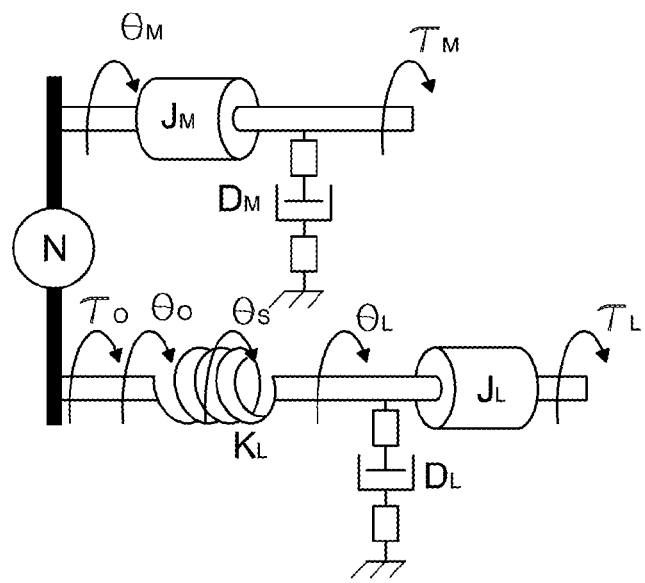
FIG. 3 is a diagram illustrating a mechanical model of an elastic rotary actuator of the type shown in FIGS. 1 and 2, used to define the control method according to the disclosure.

FIG. 3 shows a mechanical model of the elastic rotary actuator 10 according to FIGS. 1 and 2, which model takes into account as main components of the actuator the motor 16, the reduction gear 18 and the elastic module formed by the input member 14, by the springs 20 and 20' and by the output member 12, and also takes into account an external load rotationally driven by the actuator, such as for instance a robotic arm. The motor 16 is defined by a moment of inertia $J_M$ and by a viscous damping coefficient $D_M$. The reduction gear 18 is defined by a reduction ratio N. The elastic module is defined by an equivalent elastic constant $K_S$, representing the overall stiffness of the elastic module. The load is defined by a moment of inertia $J_L$ and by a viscous damping coefficient $D_L$, $\theta_M$, $\theta_O$ and $\theta_L$ represent the angular positions of the motor 16 (i.e. before the reduction gear 18), of the input member 14 (i.e. after the reduction gear 18), and of the load, respectively, while $\theta_S$ represents the deflection of the elastic module, i.e. the relative rotation between the input member 14 and the output member 12 (i.e. the load), whereby $\theta_S = \theta_L - \theta_O$. $\tau_M$, $\tau_O$ and $\tau_L$ represent the torque applied by the motor 16, the torque applied by the input member 14 (i.e. the input torque of the elastic module), and the resisting torque imposed by the load, respectively.

The equivalent elastic constant provided by the elastic module is given by:

$$K_S = \frac{d\tau_L}{d\theta_S} = 6 \cdot K_A \cdot \left(R^2 + \frac{r_S^2}{3}\right) \cdot (2 \cdot \cos^2\theta_S - 1), \quad (1)$$

where R is the distance between the axis of the springs 20 and 20' and the axis X of the output member 12, $K_A$ is the axial stiffness of each of the springs 20 and 20' and $r_S$ is the external radius of each of the springs 20 and 20'.

The mechanical model of FIG. 3 is described by the following set of equations in the Laplace domain:

$$(J_M \cdot N^2 \cdot s^2 + D_M \cdot N^2 \cdot s + K_S) \cdot \theta_O - K_S \cdot \theta_L = \tau_O \quad (2)$$

$$(J_L \cdot s^2 + D_L \cdot s + K_S) \cdot \theta_L - K_S \cdot \theta_O = \tau_L \quad (3)$$

According to equation (3), the impedance of the actuator is given by the following equation:

$$Z = \frac{d\tau_L}{d\theta_L} = (J_L \cdot s^2 + D_L \cdot s + K_S) - K_S \cdot \frac{d\theta_O}{d\theta_L} \quad (4)$$

Imposing that the impedance Z of the actuator is equal to a desired value $Z_D$ and solving equation (4) for $\dot{\theta}_O$, i.e. for the angular velocity of the input member, the following equation is obtained:

$$\dot{\theta}_O = \left(\frac{K_S}{-J_L \cdot s^2 - D_L \cdot s + Z_D} - 1\right) \cdot \dot{\theta}_S. \quad (5)$$

Equation (5) only gives the fraction of the angular velocity of the input member which makes it possible to obtain a given elastic behaviour at the actuator output. Adding to this expression the term $\dot{\theta}_{TD}$ which represents the desired velocity profile for the actuator output motion, the desired velocity profile for the input member is given by the following equation:

$$\dot{\theta}_{OD} = \dot{\theta}_{TD} + \left(\frac{K_S}{-J_L \cdot s^2 - D_L \cdot s + Z_D} - 1\right) \cdot \dot{\theta}_S. \quad (6)$$

Figure 4:
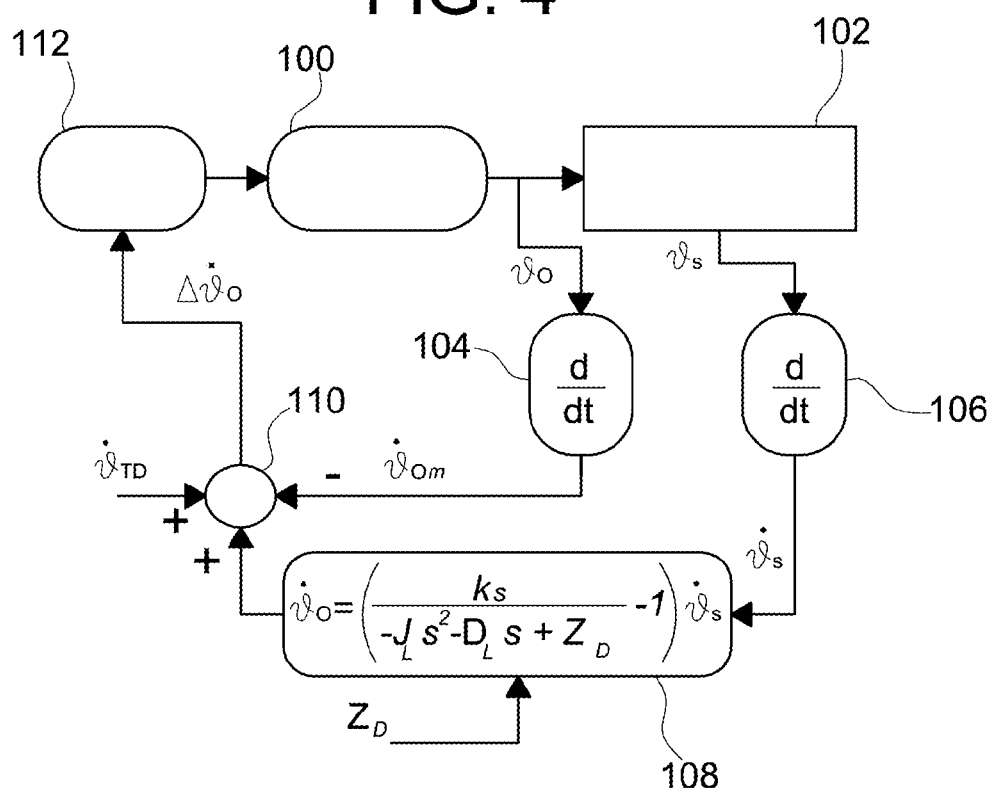
FIG. 4 is a block diagram of a system adapted to perform the control method according to the disclosure.

Equation 6 is the basis of the method for controlling an elastic rotary actuator according to the disclosure. With reference to FIG. 4, the block diagram of the control system basically comprises:

a motor and reduction gear block 100 representing the assembly formed by the motor 16 and by the reduction gear 18 of the elastic rotary actuator 10;

an elastic module block 102 representing the elastic module of the elastic rotary actuator 10 formed by the input member 14, by the springs 20 and 20' and by the output member 12;

a first derivative block 104 calculating the derivative of the angular position $\theta_O$ of the input member 14, which angular position is obtained from the measure provided by the position sensor 38 associated to the motor 16;

a second derivative block 106 calculating the derivative of the deflection angle $\theta_S$ of the elastic module provided by the sensor 40;

an angular velocity block 108 calculating the contribution to the desired angular velocity $\dot{\theta}_{OD}$ of the input member 14 given by the above equation (5), on the basis of the desired impedance value $Z_D$;

an adder block 110 calculating the error $\Delta\dot{\theta}_O$ between the desired angular velocity $\dot{\theta}_{OD}$ of the input member 14, given by the sum of the contribution $\dot{\theta}_{TD}$ and of the contribution provided by the angular velocity block 108 according to equation (6), and the measured actual angular velocity $\dot{\theta}_{Om}$, provided by the first derivative block 104;

a proportional derivative block 112 receiving the difference $\Delta\dot{\theta}_O$ provided by the adder module 110 as input and sending a voltage or current command to the motor and reduction gear block 100.

Naturally, the principle of the invention remaining unchanged, the embodiments and manufacturing details may be widely varied with respect to those described and illustrated purely by way of non-limiting examples.

What is claimed is:

1. An elastic rotary actuator comprising:
an output member rotatable around an axis of rotation;
an input member rotatable around said axis of rotation;
elastic members interposed between the output member and the input member in such a manner as to allow, due to their elastic deformation, a relative rotation between the input member and the output member around said axis of rotation, the input member being rotatable around said axis of rotation independently of the output member by way of said elastic members;
a motor assembly arranged to drive the input member to rotate around said axis of rotation; and
a control device arranged to control the motor assembly, said control device comprising a first sensor adapted to provide a signal indicative of the angular velocity of the input member, and an electronic control unit arranged to determine a desired angular velocity of the input member on the basis of a desired impedance value for the actuator and to control the motor assembly on the basis of the error between the desired angular velocity of the input member and the angular velocity of the input member determined from the signal provided by said first sensor.

2. The actuator according to claim 1, wherein said first sensor is an angular position sensor associated to the motor assembly or to the input member.

3. The actuator according to claim 1, wherein said control device further comprises a second sensor adapted to provide a signal indicative of the relative rotation between the input and output members.

4. The actuator according to claim 2, wherein said control device further comprises a second sensor adapted to provide a signal indicative of the relative rotation between the input and output members.

5. The actuator according to claim 3, wherein the electronic control unit is arranged to determine the desired angular velocity of the input member taking into account also the relative angular velocity between the input member and the output member as determined from the signal provided by said second sensor.

6. The actuator according to claim 4, wherein the electronic control unit is arranged to determine the desired angular velocity of the input member taking into account also the relative angular velocity between the input member and the output member as determined from the signal provided by said second sensor.

7. The actuator according to claim 1, wherein said elastic members comprises cylindrical helical springs arranged with their axes in a same plane perpendicular to said axis of rotation.

8. The actuator according to claim 7, wherein the axes of the springs are oriented so that each spring applies a force onto the output member which is directed mainly tangentially.

9. The actuator according to claims 7, wherein the output member is axially and radially contained within the input member and comprises a plurality of spoke portions which extend radially and are angularly equally spaced, wherein the input member comprises a corresponding plurality of abutment elements, each of which is circumferentially interposed between a pair of adjacent spoke portions of the output member, each of the springs insisting at one end against a respective face of a spoke portion of the output member and at the opposite end against a corresponding stop surface of an abutment element of the input member.

10. The actuator according to claims 8, wherein the output member is axially and radially contained within the input member and comprises a plurality of spoke portions which extend radially and are angularly equally spaced, wherein the input member comprises a corresponding plurality of abutment elements, each of which is circumferentially interposed between a pair of adjacent spoke portions of the output member, each of the springs insisting at one end against a respective face of a spoke portion of the output member and at the opposite end against a corresponding stop surface of an abutment element of the input member.

11. The actuator according to claim 9, wherein the output member comprises three spoke portions arranged at 120°, wherein the input member comprises three abutment elements arranged at 120° and wherein said elastic members comprise six cylindrical helical springs.

12. The actuator according to claim 10, wherein the output member comprises three spoke portions arranged at 120°, wherein the input member comprises three abutment elements arranged at 120° and wherein said elastic members comprise six cylindrical helical springs.

13. A method for controlling an elastic rotary actuator comprises an output member rotatable around an axis of rotation, an input member rotatable around said axis of rotation, elastic members interposed between the output member and the input member in such a way as to allow, due to their elastic deformation, a relative rotation between the input member and the output member around said axis of rotation, the input member being rotatable around said axis of rotation independently of the output member by way of said elastic members, and a motor assembly arranged to drive the input member to rotate around said axis of rotation, the method comprising the steps of:
   a) defining a desired value for the impedance of actuator;
   b) determining the desired angular velocity of the input member on the basis of the desired impedance value;
   c) detecting the actual angular velocity of the input member; and
   d) controlling the motor assembly on the basis of the error between the desired angular velocity and the detected actual angular velocity of the input member.

14. The method according to claim 13, wherein at step b) the desired angular velocity of the input member is calculated from a quantity representing the relative angular velocity between the input member and the output member.

15. An elastic rotary actuator comprising:
   an output member rotatable around an axis of rotation;
   an input member rotatable around said axis of rotation;
   elastic members, each elastic member having a first end and a second end, wherein the first end is affixed to the input member and the second end is affixed to the output member, thereby allowing a rotation of the input member relative to the output member around said axis of rotation;
   a motor assembly arranged to drive the input member to rotate around said axis of rotation; and
   a control device arranged to control the motor assembly, said control device comprising a first sensor adapted to provide a signal indicative of the angular velocity of the input member, and an electronic control unit arranged to determine a desired angular velocity of the input member on the basis of a desired impedance value for the actuator and to control the motor assembly on the basis of the error between the desired angular velocity of the input member and the angular velocity of the input member determined from the signal provided by said first sensor.

16. An elastic rotary actuator comprising:
   an output member rotatable around an axis of rotation;
   an input member rotatable around said axis of rotation;
   elastic members, each elastic member having a longitudinal axis lying in a plane normal to said axis of rotation, each elastic member having a first end and a second end along said longitudinal axis, wherein the first end is affixed to the input member and the second end is affixed to the output member, thereby allowing the input member to rotate around said axis of rotation relative to a frame of reference in which the output member is immobile, wherein a rotation vector of said rotation is collinear to the axis of rotation;
   a motor assembly arranged to drive the input member to rotate around said axis of rotation; and
   a control device arranged to control the motor assembly, said control device comprising a first sensor adapted to provide a signal indicative of the angular velocity of the input member, and an electronic control unit arranged to determine a desired angular velocity of the input member on the basis of a desired impedance value for the actuator and to control the motor assembly on the basis of the error between the desired angular velocity of the input member and the angular velocity of the input member determined from the signal provided by said first sensor.

* * * * *